United States Patent [19]

Gregory

[11] 4,160,643

[45] Jul. 10, 1979

[54] WATER SOLUBLE CATIONIC AZO DYESTUFFS CONTAINING A CYCLAMMONIUM GROUP

[75] Inventor: Peter Gregory, Manchester, England

[73] Assignee: Imperial Chemical Industries Limited, London, England

[21] Appl. No.: 757,913

[22] Filed: Dec. 27, 1976

[30] Foreign Application Priority Data

Jan. 27, 1976 [GB] United Kingdom ............... 3067/76

[51] Int. Cl.$^2$ .................. C09B 27/00; C09B 46/00; D06P 1/10; D06P 3/70
[52] U.S. Cl. ........................................ 8/26; 260/153; 260/154; 260/155; 8/25; 8/28; 8/27; 546/285
[58] Field of Search .................. 8/26; 260/152, 153, 260/154, 155, 156, 162, 163, 164, 165, 158

[56] References Cited

U.S. PATENT DOCUMENTS

| | | | |
|---|---|---|---|
| 3,948,598 | 4/1976 | Okaniwa et al. | 8/41 C |
| 3,958,287 | 5/1976 | Okaniwa et al. | 8/26 |

*Primary Examiner*—Floyd D. Higel
*Attorney, Agent, or Firm*—Cushman, Darby & Cushman

[57] ABSTRACT

A mixture of water soluble cationic azo dyestuffs devoid of carboxylic acid or sulphonic acid groups, each dyestuff in said mixture containing at least one cyclammonium group and said dyestuffs differing only in the constitution of the said cyclammonium group, said cyclammonium group being a gamma-picolinium group in one dyestuff and a beta-picolinium group in another dyestuff in said mixture, the water-solubility of said mixture being superior to that of the individual dyestuffs, the mixture being particularly useful for the coloration of polymers and copolymers of acrylonitrile.

1 Claim, No Drawings

WATER SOLUBLE CATIONIC AZO DYESTUFFS CONTAINING A CYCLAMMONIUM GROUP

This invention relates to mixtures of water-soluble cationic dyestuffs containing cyclammonium groups of the pyridinium series the components of said mixtures differing only in the constitution of the cyclammonium group. The invention further relates to the manufacture of such mixtures and to their use for the colouration of synthetic polymeric materials in the form of ribbons, tapes, fibres, films, threads, and textile materials generally. The dyestuff mixtures are particularly valuable for the colouration of polymers and copolymers of acrylonitrile and also dicyanoethylene and acid modified polyesters and polyamides.

According to the present invention there are provided mixtures of two or more water soluble cationic dyestuffs devoid of carboxylic acid or sulphonic acid groups, each dyestuff containing at least one cyclammonium group, said dyestuffs differing only in the constitution of the cyclammonium group, which is a lower alkyl ring substituted pyridinium group in at least one of said dyestuffs.

By the term lower alkyl used in this specification is meant an alkyl group of from one to four carbon atoms.

The mixtures of dyestuffs of the present invention include mixtures of any of the well-known classes of water soluble azo dyestuffs for example mixtures of azo dyestuffs of the formula

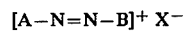

wherein A is the residue of a diazo component, B is the residue of a coupling component, X is an anion and either A or B contains a cyclammonium group which must be a lower alkyl ring substituted pyridinium group in at least one of said components.

The residue of the diazo component A may be, for example, a benzene residue, naphthalene residue or a heterocyclic residue any of which may be optionally substituted with the substituents normally present in dyestuff molecules except for carboxylic acid and sulphonic acid groups.

The residue of the coupling component B may be, for example, a benzene residue such as a substituted arylamine, a phenol, a naphthalene residue such as a naphthylarylamide or a naphthol, a pyrazolone, a pyrazole, a pyridone, a homophthalimide, an indole, an indoline a quinoline or tetrahydroquinoline any of which may be substituted with substituents normally present in dyestuff molecules except for carboxylic acid or sulphonic acid groups.

The anion X may be the anion of any inorganic or organic acid capable of forming a salt with a quaternary nitrogen atom. Specific examples include inorganic anions such as chloride, bromide, iodide, tetrachlorozincate, bisulphate, sulphate, nitrate, sulphamate, phosphate, borate, tetrafluoroborate, perborate and phosphomolybdate and organic anions such as acetate, propionate, oxalate, maleate, lactate, succinate, chloroacetate, benzoate, methylsulphate, p-tolyl sulphonate and methane sulphonate.

The individual dyestuffs of the present mixtures of dyestuff differ only in the particular cyclammonium group present in the dyestuff which in at least one dyestuff of said mixture is a lower alkyl ring substituted pyridine.

Examples of lower alkyl ring substituted pyridinium groups which may be present as cyclammonium groups in the component dyestuffs of the dyestuff mixtures of the invention include alpha-picolinium, beta-picolinium, gamma-picolinium, 2,3-lutidinium, 2,4-lutidinium, 2,5-lutidinium, 2-ethyl-pyridinium and 4-ethyl-pyridinium. It is preferred that in one of the components of the dyestuff mixture the cyclammonium group be gamma-picolinium and especially preferred that in one dyestuff component the cyclammonium group should be gamma-picolinium and in another component, beta-picolinium.

In the dyestuff mixtures of the present invention, in addition to one or more dyestuffs wherein the cyclammonium group is a lower alkyl ring substituted pyridinium group there may be present, dyestuffs differing only in the cyclammonium group wherein the cyclammonium group is for example a pyridinium, quinolinium or iso-quinolinium group in particular a pyridinium group.

It is preferred that all the components of the dyestuff mixture have cyclammonium groups of the pyridine series, i.e. pyridinium or lower alkyl ring substituted pyridinium groups.

Thus the dyestuff mixtures may contain at least two components, one containing a lower alkyl ring substituted pyridinium group and also further components containing other cyclammonium groups which may be but are not necessarily lower alkyl ring substituted pyridinium groups.

Preferred dyestuff mixtures are those wherein the content of the dyestuff containing a gamma-picolinium group is from 5% to 95% of the mixture and also those mixtures which contain from 5% to 95% of a dyestuff containing a gamma-picolinium group and from 95% to 5% of a dyestuff containing a beta-picolinium group.

Mixtures of the present invention include in particular mixtures of azo dyestuffs.

One set of soluble dyestuff mixtures are those wherein the dyestuff is of general formula

wherein $A^1$ is the residue of an aromatic or heterocyclic diazo component, R is hydrogen, or an optionally substituted alkyl, aryl or aralkyl group and $R^1$ is an alkylene group optionally containing hetero atoms, Y is a cyclammonium group which is different in the different constituents of the mixture, and in at least one of said constituents is a lower alkyl substituted pyridinium group, X is an anion and the ring D can carry further substituents.

Examples of R include hydrogen, methyl, ethyl, propyl, butyl benzyl, β-cyanoethyl, β-carbamoylethyl, phenyl and β-hydroxyethyl Examples of further substituents which may be present in the ring D include alkyl particularly lower alkyl such as methyl and ethyl, alkoxy such as methoxy, ethoxy and benzyloxy, aryloxy such as phenoxy, halogen such as bromine and chlorine, trifluoromethyl, sulphonamide and substituted sulphonamide such as sulphondimethylamide and the diethylamide, alkoxycarbonyl such as methoxy carbonyl and ethoxycarbonyl, acylamino such as acetylamino, propionylamino and formamido and ureido.

Further soluble dyestuff mixtures wherein only the cyclammonium groups is different include (A) those wherein the coupling component is a pyrazolone and the dyestuff is of the general formula

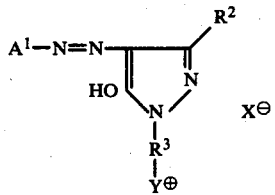

wherein $R^2$ is alkyl or alkoxycarbonyl group, $R^3$ is a substituted arylene group and Y, $A^1$ and X are as hereinbefore defined.

Examples of $R^2$ include methyl, ethyl, methoxycarbonyl and ethoxycarbonyl.

Examples of $R^3$—(Y) include phenylene.

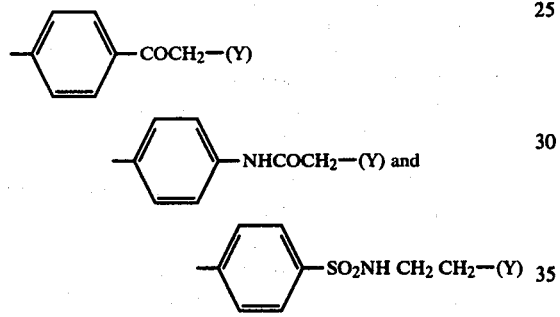

(B) those wherein the coupling component is a pyridone and the dyestuff is for example of the following formula

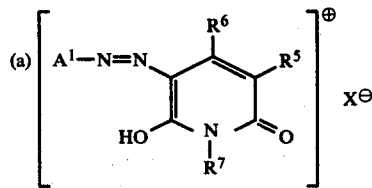

wherein $R^5$ is hydrogen, an optionally-substituted alkyl, aryl, aralkyl or cycloalkyl group, halogen, cyano, nitro or a group of the formula $COR^8$, $COOR^8$, $CONR^8R^9$, $SO_2NR^8R^9$ wherein $R^8$ and $R^9$ represent hydrogen or optionally-substituted alkyl, aralkyl, cycloalkyl, aryl or heterocyclic residues, $R^6$ is a non-ionogenic substituent particularly an alkyl or aryl group and $R^7$ is an optionally-substituted alkyl, aryl or aralkyl radical carrying a cyclammonium group Y as hereinbefore defined and $A^1$ and $X^1$ are as hereinbefore defined.

Examples of $R^5$ include hydrogen, methyl, ethyl, n-butyl, acetyl, propionyl, nitro, cyano and carbonamido.

Examples of $R^6$ include methyl, ethyl and phenyl.
Examples of $R^7$ include cyclammonium ethyl.
Examples of $R^8$ and $R^9$ include hydrogen, methyl and ethyl.

or (b) 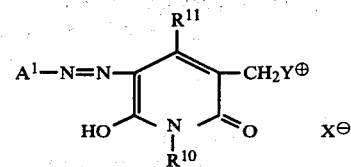

wherein $R^{10}$ is hydrogen or an optionally-substituted alkyl, alkenyl, cycloalkyl, aralkyl or aryl group, $R^{11}$ is lower alkyl of from 1 to 4 carbon atoms or an aryl group and Y is a cyclammonium group as hereinbefore defined and $A^1$ and X are as hereinbefore defined.

As examples of $R^{10}$ there may be mentioned hydrogen, methyl, ethyl, n-propyl n-butyl, β-hydroxyethyl, β-methoxyethyl, β-ethoxyethyl, cyanomethyl, carbamoylmethyl, carbethoxymethyl, acetylmethyl, allyl, benzyl, β-phenylethyl, cyclohexyl, phenyl, o, m and p-tolyl, o, m and p-chlorophenyl and o, m and p-methoxyphenyl.

As examples of $R^{11}$ there may be mentioned alkyl groups containing from 1 to 4 carbon atoms especially methyl and ethyl.

(C) those wherein the coupling component is an isoquinoline-1,3-diol (homophthalimide) and the dyestuff is for example of the following general formula

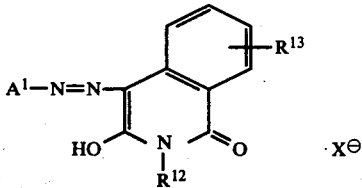

wherein $R^{12}$ is an optionally substituted alkyl, aryl or aralkyl group carrying a cyclammonium group Y as hereinbefore defined, $R^{13}$ is hydrogen or a nonionogenic group and $A^1$ and X are as hereinbefore defined.

As examples of $R^{12}$ there may be mentioned α-cyclammonium propyl and β-cyclammonium ethyl.

As examples of $R^{13}$ there may be mentioned hydrogen and nitro.

(D) those wherein the coupling component is an amino quinoline and the dyestuff is for example of the general formula;

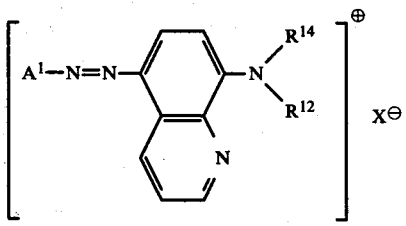

wherein $R^{12}$ is as hereinbefore defined, the quinoline ring may be further substituted, $R^{14}$ is hydrogen or an optionally-substituted aryl, alkyl or aralkyl group and $A^1$ and X are as before defined Examples of $R^{12}$ include those mentioned hereinbefore.

(E) those wherein the coupling component is a tetrahydroquinoline and the dyestuff is for example of the general formula

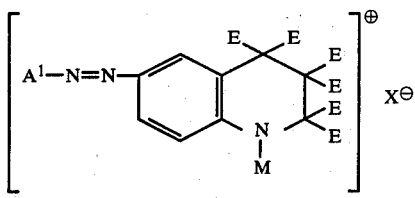

wherein the various residues E may independently by hydrogen or lower alkyl particularly methyl or ethyl, M is an organic substituent containing a cyclammonium group Y, the tetrahydroquinoline ring may be substituted in the unsaturated ring and $A^1$ and X are as before defined, and (F) those wherein the coupling component is a pyridone with a cyclammonium group directly attached in the 3-position of the pyridone ring, for example those of the formula

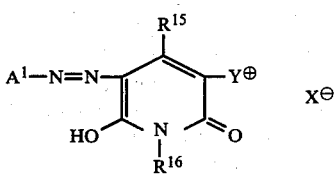

wherein $R^{15}$ is hydrogen, halogen, cyano, nitro, hydroxy or amino or an organic radical and $R^{16}$ is hydrogen or an optionally substituted hydrocarbon or heterocyclic radical or an amino group which may be substituted, Y is as hereinbefore defined and $A^1$ and X are as before defined.

Amines from which the diazo component $A^1$ may be derived include aniline, o-, m- or p-toluidine, o-, m- or p-anisidine, o-, m- or p-nitroaniline, 2,5-dichloroaniline, 2,4-dinitroaniline, 2,4-dinitro-6-(chloro or bromo)-aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2,6-di(chloro- or bromo-)-4-nitroaniline, 2,4,6-trinitroaniline, 2,4-dinitro-6-carbomethoxyaniline, 2-amino-5-nitrobenzotrifluoride, 2,4-bis(-methanesulphonyl) aniline, 2-(chloro- or bromo-)-4-nitroaniline, methylanthranilate, 4-or 5-nitromethylanthranilate, 4-aminobenzamide, 2,6-di(chloro- or bromo-)aniline-4-sulphonamide, 2,6-di(chloro- or bromo-)-4-methylsulphonylaniline, 2,5-di(chloro- or bromo-)-4,6-dinitroaniline, 2-amino-3,5-dinitrobenzotrifluoride 3-amino-2-(chloro- or bromo-)-4,6-dinitro(toluene or anisole), 3-amino-4-(chloro- or bromo-)-2,6-dinitro(toluene or anisole), 2- or 4-cyanoaniline, 4-nitro-2-cyanoaniline, 2,4-dinitro-6-cyanoaniline, 2-nitro-4-cyanoaniline, 2-chloro-4-cyanoaniline, 3-amino-2,4,6-trinitrotoluene, 2-(chloro- or bromo-)-4-methylsulphonylaniline, 3-(chloro- or bromo-)-thiocyanatoanilie, 2-(chloro- or bromo-)-4-sulphamylaniline, 2-amino-5-nitrophenylmethanesulphone, 2-amino-3,5-dinitrophenylmethylsulphone, 2-amino-3-(chloro-or bromo-)-5-nitrophenylmethylsulphone, 2-sulphamyl-4-nitroaniline 2-methylsulphamyl-4-nitroaniline, 2-ethyl-sulphamyl-4-nitroaniline, 2-butylsulphamyl-4-nitroaniline, 2-dimethylsulphamyl-4-nitroaniline, 2-methylsulphamyl-4,6-dinitroaniline, 2-methylsulphamyl-4-nitro-6-(chloro- or bromo-)aniline, 2-phenylsulphamyl-4-nitroaniline, methyl 2-amino-3-(chloro- or bromo-)-5-nitrobenzoate, dimethyl 2-aminoterephthalate, dimethyl 2-amino-5-nitrotereph-thalate, aniline -2-, 3-or 4-sulphamate, aniline-2-, 3- or 4-N,N-dimethylsulphamate, 4-aminobenzenesulphonamide, 2-nitro-4-methylaniline, 2-cyano-4-methylaniline, 4-chloro-2-methylaniline, 2-aminothiazole, 2-amino-6-methoxybenzthiazole, 2-amino-6-methylsulphonyl benzthiazole, 2-amino-6-nitro-benzthiazole, 2-aminobenzthiazole, 2,5-dimethoxyaniline, 2-amino-5-nitrothiazole, 2-amino-4-methyl-5-nitrothiazole, 2-amino-4-m-nitrophenyl-5-nitrothiazole, 3-methyl-5-amino-1,2,4-thiadiazole, 3-methylsulphonyl-5-amino-1,2,4-thiadiazole, 3-methylmercapto-5-amino-1,2,4-thiadiazole, 3-phenyl-5-amino-1,2,4-thiadiazole, 2-amino-1,3,4-thiadiazole, 2-amino-5-nitro 1,3,4-thiadiazole, 4-aminobenzene(2,5- or 3,5-dichloro)benzenesulphon-M, N-dimethylamide, 4-amino-3-chloro-benzenesulphon-N,N-dimethylamide, 5-chloro-2,4-bis-(N,N-dimethylaminosulphonyl)aniline, 2-chloro-5-cyanoaniline, 2-cyano-5-chloroaniline, 2,4-dicyanoaniline, 4-aminodiphenylamine, 4-aminodiphenylmethane, 4-aminodiphenylsulphone, 4-aminoazobenzene, 4-phenylazo-1-aminonaphthalene, 2-aminobenzenesulphon-N,N-dimethylamide, 2-trifluoromethylaniline, 2- or 4-aminobenzonitrile, 2-aminophenylmethyl or ethylsulphone and 4-chloro-2-trifluoromethylaniline.

Other soluble dyestuff mixtures of the present invention are those wherein the cyclammonium group is present in the diazo component of the dyestuff, for example those of the formula:

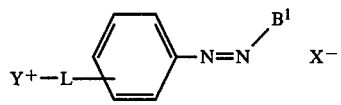

wherein, Y+ *is a cyclammonium group, L is a linking group*, $B^1$ is the residue of a coupling component and there may be the usual dyestuff substituents present in the benzene ring of the diazo component.

Examples of the linking group L include

| | |
|---|---|
| —SO₂NHCH₂CH₂— | —CH=N— |
| —COCH₂— | —SO₂NHCH₂CH₂CH₂— |
| —NHCOCH₂— | —SO₂CH₂CH₂— |
| —CONHCH₂CH₂CH— | —OCH₂CH₂OCOCH₂— |
| —COOCH₂CH₂— | —CH₂NHCOCH₂— |
| —OCH₂CH₂OCOCH₂—CH₂— | —COCH₂CH₂— |
| —OCH₂CH₂ | —SO₂CH₂— |
| —NHCH= | —SCH₂CH₂— |
| —CONH— | —CH₂— and |
| —N(C₂H₅ — COCH₂— | —CH₂CH₂— |
| —OCH₂CH₂OCO— | |

Examples of further substituents which may be present in the benzene ring of the diazo component include methyl, ethyl, methoxy, ethoxy, benzyloxy, phenoxy, bromine, chlorine, nitro, cyano, trifluoromethyl, sulphonamido, N-dimethyl and diethylsulphonamido, methoxycarbonyl, ethoxycarbonyl, formamido, acetylamino, propionylamino, and ureido, alkylsulphonyl, thiocyanato, acyl such as methylcarbonyl.

The residue of the coupling component $B^1$ ring may be a member of any of the known classes of coupling component, for example a benzene residue, a substituted arylamine, a phenol, a naphthalene residue, a pyrazolone, a pyrazole, a pyridone, a homophthalimide, an indole, an indoline, a quinoline, tetrahydroquinoline, an indazole or acetoacetarylamide, any of which may be substituted with substituents usually present in dyestuff molecules except for sulphonic acid or carboxylic acid groups.

Particularly valuable dyestuffs of this type are those of the formula:

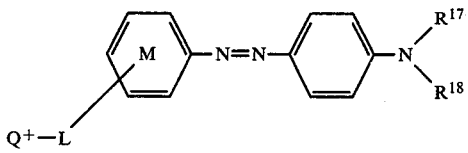

wherein Q and L are as hereinbefore defined, $R^{17}$ is hydrogen or an optionally-substituted alkyl, aryl or aralkyl group, $R^{18}$ is an optionally substituted alkyl, aryl or aralkyl group or alternatively $R^{17}$, $R^{18}$ and the nitrogen atom form a heterocyclic ring, for example a morpholino or piperidino ring, the benzene ring of the coupling component may be further substituted in the 2- and 5-positions, and the benzene ring M of the diazo component may be substituted.

Examples of $R^{17}$ include hydrogen, methyl, ethyl, propyl, butyl, benzyl, β-cyanoethyl, β-carbamoylethyl, phenyl and β-hydroxyethyl.

Examples of $R^{18}$ are as given $R^{17}$ except hydrogen.

Examples of heterocyclic rings formed by $R^{17}$, $R^{18}$ and the nitrogen atom include morpholine and piperidine.

Specific examples of further substituents which may be present in the benzene ring of the coupling component include methyl, ethyl, methoxy, ethoxy, chloro, bromo, trifluoromethyl, sulphonamido, sulphon-N,N-dimethylamide and the diethylamide, methoxycarbonyl, ethoxycarbonyl, phenoxy, acetylamino, formamido, propionylamino and ureido.

Specific examples of further substituents which may be present in the benzene ring M of the diazo component, of which there may be one or two substituents which may be same or different selected from chlorine, bromine, nitro, methyl, methoxy, alkyl sulphonyl and sulphonamido.

Another valuable type of dyestuff is mixture of the formula

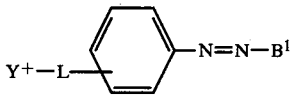

where $B^1$ is the residue of an indole.

Other dyestuffs mixtures which are included within the present invention include dyestuffs of the anthraquinone series containing a pendant cyclammonium group linked to the anthraquinone nucleus, for example dyestuffs described inter alia in British Pat. No. 1392184. As with the other dyestuffs referred to above, the components of such mixtures differ only in the cyclammonium group.

The dyestuffs mixtures of the invention may be made by known methods, for example azo dyestuffs may be made by processes of diazotisation and coupling.

Thus there is provided as a further feature of the present invention, a process for the manufacture of mixtures of water soluble azo cationic dyestuffs which comprises diazotising an aromatic or heterocyclic primary amine and coupling the diazo compound with a coupling component characterised in that either the primary amine component or the coupling component contains a cationic cyclammonium group and that said component containing the cationic cyclammonium group is a mixture of compounds differing only in the constitution of the cyclammonium group which is a lower alkyl ring substituted pyridinium group in at least one of said compounds.

Dyestuff mixtures wherein the cyclammonium group is present in the coupling component may be manufactured by diazotising an aromatic or heterocyclic primary amine and coupling the resultant diazo compound with a mixture of coupling components containing cyclammonium cationic groups, said coupling components differing only in the constitution of the cyclammonium group, which is a lower alkyl ring substituted pyridinium group in at least one of said coupling components.

Any of the amines listed above from which $A^1$ may be derived may be used as diazo components in the reaction.

Examples of coupling components which may be used include the following in which the term cyclammonium is used to denote the fact that the listed components are mixtures in which the cyclammonium groups are different and specifically that these mixtures include at least one component wherein the cyclammonium group is a lower alkyl ring substituted pyridine.

By way of illustration the first coupling component listed could be a mixture of β-(N-phenyl-N-ethylamino)ethyl-β-picolinium chloride and β-(N-phenyl-N-ethylamino)ethyl-γ-picolinium chloride or could be a mixture of one or both of these two compounds with for example:

β-(N-phenyl-N-ethylamino)ethyl-pyridinium chloride and/or

β-(N-phenyl-N-ethylamino)ethyl-quinolinium chloride

Coupling components as defined above include:

β-(N-phenyl-N-ethylamino)ethyl cyclammonium chloride

β-(N-phenyl-N-methylamino)ethyl cyclammonium chloride

β-(N-phenyl-N-propylamino)ethyl cyclammonium chloride

β-(N-3'-methylphenyl-N-ethyl)ethyl cyclammonium chloride

β-(N-3'-acetylaminophenyl-N-ethyl)ethyl cyclammonium chloride

γ-(N-phenyl-N-ethylamino)-β-hydroxypropyl-cyclammonium chloride

β-(N-phenylamino)ethyl cyclammonium chloride

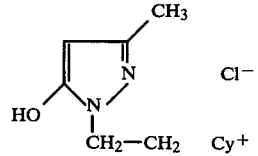

(m-N,N-diethylaminophenyl)aminocarbonylmethyl cyclammonium chloride

β-(m-N,N-diethylaminophenylsulphonylamino)ethyl cyclammonium chloride p-(β-N-ethyl-N-phenylaminoethoxy)phenyl cyclammonium methosulphate β-(2'-methylindol-1'-yl)ethyl cyclammonium chloride γ-(3'-cyano-4'-methyl-6'-hydroxypyrid-2'-onyl)propyl cyclammonium chloride γ-(3'-hydroxyisoquinol-1'-on-2'-yl)propyl cyclammonium chloride p-(5'-hydroxy-3'-methylpyrazol-1'-yl-)phenylaminocarbonylmethylcyclammonium chloride

[m-N,N-bis(2-hydroxyethyl)aminophenyl]amino carbonyl methyl cyclammonium chloride β-(N-(2-chloroaniline)ethyl cyclammonium chloride β-(N-(2-bromoaniline)ethyl cyclammonium chloride β-(N-(2-chloro-5-ethylanilino) ethyl cyclammonium chloride

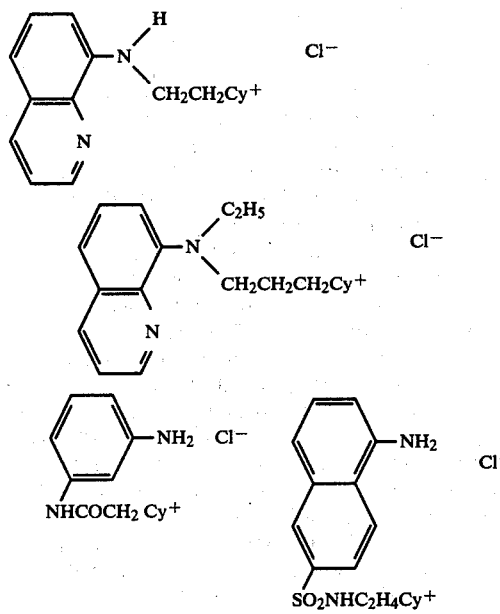

where Cy represents cyclammonium.

Coupling component mixtures for use in the above process can be made by known methods for such compounds but using in place of a single cyclic amine such as pyridine a mixture of cyclic amines of which at least one is a lower alkyl ring substituted pyridine for example α-picoline, β-picoline, γ-picoline, or 2,4-lutidine. Other cyclic amines such as pyridine or quinoline may be present in the mixture.

Mixtures of cyclic amines which may be used may be synthetic mixtures of the desired cyclic amines but are preferably the commercial mixtures of cyclic amines often described as 'pyridine bases' obtained as distillation fractions after extraction from coal tar distillates.

A variety of such additives are readily available commercially and consist of mixtures of pyridine homologues sometimes with other bases such as pyridine itself, quinoline and isoquinoline.

A typical example analysed as follows:

| | % by weight | |
|---|---|---|
| Pyridine | 0.5 | |
| α-Picoline | 3 | |
| β-Picoline | 34 | The remainder consists |
| γ-Picoline | 24 | mainly of low boiling |
| 2,6-lutidine | 35 | compounds : |
| | 96.5% | |

We have found that using about 3 mols of the above mixture to 1 mole of say 2-chloroethyl-o-chloroaniline gives an approximately 50/50 mixture of quaternary salts derived from β-picoline and γ-picoline with small amounts of quaternary salts derived from pyridine and α-picoline. We found that the 2,6-lutidine was practically ineffective as a quaternary agent, presumably on account of steric hindrance.

Among others the following crude mixtures of pyridine homologues have proved useful, Mixed picolines 145 sold by Reilly Tar and Chemical Corporation Pyridine Bases sold by Hopkin and Williams Grades 636, 612 and 621 sold by Midland Yorkshire Tar Distillers.

As γ-picoline has a greater solubilising effect on the dyestuff we prefer to use mixtures of pyridine homologues which give dyestuff mixtures wherein the dyestuff with a γ-picolinium cyclammonium group comprises from 5% to 95% of the dyestuff mixture. We therefore prefer to use mixtures of pyridine homologues of which the γ-picoline content is from 5% to 95%. of the active quaternising bases.

Dyestuff mixtures wherein the cyclammonium group is present in the diazo component may be manufactured by diazotising a mixture of diazotisable amines containing cyclammonium groups, which amines differ only in the constitution of the cyclammonium group which is a lower alkyl ring substituted pyridinium group in at least one of said amines, and coupling the diazo compound.

Examples of amines which may be used include the following in which the term cyclammonium is used to denote that the listed amines are mixtures containing different cyclammonium groups and in particular that the mixtures include at least one component wherein the cyclammonium group is a lower alkyl ring substituted pyridines.

(4-Aminophenylsulphonylamino)ethylcyclammonium chloride, (4-amino-3-chlorophenylsulphonylamino)ethyl cyclammonium chloride, (4-amino-2,5-dichlorophenylsulphonylamino)ethyl cyclammonium chloride, (4-amino-3,5-dichlorophenylsulphonylamino)ethyl cyclammonium chloride, (4-aminophenylaminocarbonyl)-methylcyclammonium chloride, (4-aminophenylsulphonylaminoethyl cyclammonium chloride, N$^1$-4-aminophenylcarbonylmethyl cyclammonium chloride, 4-aminophenyloxyethylcarbonyloxy-ethyl cyclammonium chloride, 3-(4'-aminobenzoylamino)phenyl-methylcyclammonium chloride, 4-aminophenyl-methyl-cyclammonium chloride, (3-aminophenylsulphonylamino)ethyl cyclammonium chloride, 3-aminophenyl-methyl-cyclammonium chloride, 3-aminophenylaminocarbonyl-methyl-cyclammonium chloride, 3-aminophenysulphonylaminoethyl cyclammonium chloride, (4-aminophenylsulphonylamino)-ethyl-2-methyl cyclammonium chloride.

These amines may be obtained by well known methods, for example by reacting a nitrosamine which contains an anion forming group which is capable of being quaternished by a suitable quaternising agent, followed by reduction of the nitro group to an amino group or by replacing the nitro group by an acylamino group and obtaining the required amine by hydrolysis instead of reduction.

Examples of coupling components which may be used for reaction with the diazotised amine mixture include
aniline, m-toluidine, m-anisidine, m-ureidoaniline
N,N-dimethylaniline
N,N-diethyl-m-toluidine
N-ethyl-N-(2-hydroxyethyl)aniline
N-methyl-N-(2-cyanoethyl)aniline
N-ethyl-N-(2-cyanoethyl)aniline
N-(2-cyanoethyl)-2-chloroaniline
N,N-bis(2-acetoxyethyl)-m-toluidine
N-ethyl-N-benzylaniline
N,N-dibenzylaniline
2:5-dimethoxyaniline
N-benzyl-N-(2-hydroxyethyl)aniline
N-ethyl-N-(2-methoxyethyl)aniline
N-methyl-N-(2-ethoxyethyl)-m-toluidine
N-cyclohexyl-m-toluidine
N-cyclohexyl-N-propyl-m-toluidine
N-cyclopentyl-N-ethyl-m-toluidine
N-ethyl-N-(2-methyl-n-propyl)-m-toluidine
N,N-di-n-propyl-m-toluidine
N-butyl-N-(3-methyl-n-propyl)-m-toluidine
N-butyl-N-(2,4-dimethyl-n-butyl)-m-toluidine
Diphenylamine
N-methyl-diphenylamine
N-methyl-N-allylaniline
N-ethyl-N-(2-phenylethyl)aniline
N-ethyl-N-(2-chloroethyl)-m-anisidine
N-methyl-N-(2-bromoethyl)aniline
N-methyl-N-(2-hydroxypropyl)aniline
N-methyl-N-(3-hydroxypropyl)aniline
N-methyl-N-(2-hydroxybutyl)aniline
N-ethyl-N-(2-hydroxy-3-methoxypropyl)aniline
N-ethyl-N-(2-hydroxy-3-ethoxypropyl)aniline
N-ethyl-N-(2-hydroxy-3-propoxypropyl)aniline
N-methyl-N-(2-hydroxy-3-phenoxypropyl)aniline
N-methyl-N-(2-hydroxy-2-phenylethyl)aniline
N-ethyl-N-(2-methoxycarbonylethyl)aniline
N-ethyl-N-(2-ethoxycarbonylethyl)-m-toluidine
N-ethyl-N-(2-propoxycarbonylethyl)-m-chloroaniline
N-(2-hydroxyethoxyethyl)-N-ethylaniline
N-(2-methoxyethoxycarbonylethyl)-N-m-toluidine
N-phenylmorpholine
N-phenylpyrrolidine
N-phenylpiperidine
5-propionamido-N,N-diethylaniline
8-aminoquinoline
m-aminoacetanilide
p-xylidine
N-methyl-2-methylindole
N-ethyl-2-methylindole
N-methylindole
2-phenylindole
N-ethyl-2-phenylindole
2,5-dimethylindole
2-methylindoline
2,3,3-trimethylindoline
N-(2-hydroxyethyl)-2-methylindoline
N-methyl-2-phenyl indoline
N-(2-hydroxyethyl)-2-phenylindoline
N-butyl-2,3,3-trimethylindoline
N-(2-hydroxyethyl)-2,3,3-trimethylindoline
N-(2-hydroxyethyl)-2,6-dimethylindoline
1-phenyl-3-methyl-pyrazol-5-one
1-(3'-chlorophenyl)-3-methyl-pyrazolin-5-one
1-ethyl-3-carboxylic amide pyrazolin-5-one
1-β-cyanoethyl-3-ethoxycarbonyl-1-pyrazolin-5-one
1-phenyl-3-methyl-5-aminopyrazole
1-(4'-methylphenyl)-3-methyl-2-pyrazolin-5-one
and the following pyridones,
2,6-dihydroxypyridine, 2,6-dihydroxy-3-cyano-4-methylpyridine, 1-(methyl or ethyl)-3-cyano-4-methyl-6-hydroxypyrid-2-one, 1-(β-hydroxyethyl or γ-methoxypropyl)-3-cyano-4-(methyl, phenyl or ethyl)-6-hydroxypyrid-2-one, 1-(phenyl, p-tolyl or p-anisyl)-3-cyano-4-(methyl or phenyl)-6-hydroxypyrid-2-one, 1-phenyl-3-(carbonamido, carboxy or carboethoxy)-4-(methyl or phenyl)-6-hydroxypyrid-2-one, 2,6-dihydroxy-3-(carbonamido, carboethoxy, carbodiethylamido)-4-methylpyridine, 2,6-dihydroxy-3-(carbonamido or carboethoxy) pyridine, 2,6-dihydroxy-3-carbonamido-4-phenylpyridine, 2,6-dihydroxy-3-cyano-4-carbonamidopyridine, 2,6-dihydroxy-3-cyano-4-(carboxy, carbomethoxy or carboethoxy)-pyridine, ethyl 2,6-dihydroxy-3-cyanopyrid-4-yl acetate, 2,6-dihydroxy-3-cyanopyrid-4-ylacetamide, 2,6-dihydroxy-3,4-di(carboxy or carboethoxy)pyridine, 2,6-dihydroxy-3-carbonamido-4-carboethoxypyridine, 2,6-dihydroxy-4-methylpyridine, ethyl 2,6-dihydroxy isonicotinate, 2,6-dihydroxy isonicotinamide, 2,6-dihydroxy iso-nicotinic acid diethylamide, 2,6-dihydroxy-4-cyanopyridine, 2,6-dihydroxy-4-phenylpyridine, 2,6-dihydroxy-4-(p-hydroxyphenyl) pyridine, 2,6-dihydroxy-4-(p-methoxyphenyl)pyridine, 1-(β-dimethylaminoethyl or γ-dimethylaminopropyl)-3-cyano-4-(methyl and phenyl or ethyl)-6-hydroxypyrid-2-one.

There may also be used as coupling components the tetracyclohydroquinolines listed in British Pat. Nos. 1,526,200, 1,524,820 and 1,525,239.

Dyestuffs mixtures of the formula:

$$A^1-N=N-\underset{\underset{R^{10}}{N}}{\overset{R^{11}}{\underset{\parallel}{C}}}\begin{matrix}\\ CH_2Y^\oplus \\ =O\end{matrix} \quad X^\ominus$$

wherein $A^1$, $R^{10}$, $R^{11}$, Y and X are as hereinbefore defined may be made by the method of British Pat. No. 1377612 using in place of a single cyclic amine such as pyridine a mixture of pyridine homologous, containing at least one lower alkyl ring substituted pyridines.

The dyestuff mixture of this invention are notable for their superior water solubility which in addition to being superior to the corresponding single pyridinium compound is superior to that obtained with single picolinium compounds. This superior solubility makes them valuable for dyeing processes for which the pyridinium compounds do not possess sufficient solubility.

The dyestuff mixtures in addition to superior water solubility also have superior solubility in solvents used for the manufacture of concentrated liquid formulations of water soluble cationic dyestuffs.

The dyestuff mixture of this invention are valuable for obtaining yellow to blue shades on polymeric materials particularly in the form of textile materials especially those containing polymers and copolymers of acrylonitrile and of dicyanoethylene and also textile materials comprising polyesters, polyamides and cellulose esters. The polymeric materials may be modified, for example acid modified.

The dyestuff mixtures may be applied to synthetic polymeric materials from aqueous solution. In particular the dyestuff mixtures may be applied to polyacrylonitrile, polydicyanoethylene materials and acid modified polymeric materials from an acid, neutral or slightly alkaline dyebath (i.e. pH 3 to 8) at temperatures of 40° to 120° C. preferably 80° to 120° C., or by printing techniques using thickened printing pastes. The dyestuff mixtures have good fastness properties.

The dyestuff mixtures may also be applied by transfer printing methods in which a support such as paper is printed with an ink containing the dyestuff mixture, the printed support is placed in contact with a textile material and the whole then subjected to heat and pressure under humid/wet conditions to transfer the colour to the textile material.

The invention is illustrated but not limited by the following examples in which all parts are by weight except where otherwise stated.

In the following Examples a variety of mixtures of pyridine bases as mixtures of ring lower-alkyl substituted pyridines are often described, have been used and are designated A to G as follows. These mixtures were used to obtain mixtures of dyestuffs which differed only in the cyclammonium group

| Base Mixture A | % |
| --- | --- |
| Pyridine | 0.5 |
| alpha-picoline | 3 |
| beta-picoline | 34 |
| gamma picoline | 24 |
| 2,4-lutidine | 0.5 |
| 2,6-lutidine | 35 |
| 2-ethyl pyridine | 3 |
| | 100% |

| Base Mixture B | % |
| --- | --- |
| Pyridine | 0.5 |
| alpha-picoline | 5 |
| beta-picoline | 26 |
| gamma-picoline | 19 |
| 2,4-lutidine | 1.5 |
| 2,6-lutidine | 31 |
| 2,5-lutidine | 1 |
| 2-ethylpyridine | 4 |
| 2-vinylpyridine | 1.5 |
| | 89.5 |

| Base Mixture C | % |
| --- | --- |
| Pyridine | 0.3 |
| alpha-picoline | 0.3 |
| beta-picoline | 45 |
| gamma-picoline | 48 |
| 2,4-lutidine | 0.5 |
| 2,6-lutidine | 0.9 |
| 2,5-lutidine | 0.4 |
| 2-ethyl-pyridine | 0.3 |
| | 95.7 |

| Base Mixture D | % |
| --- | --- |
| Pyridine | 1 |
| alpha-picoline | 0.7 |
| beta-picoline | 43 |
| gamma-picoline | 50 |
| 2,4-lutidine | 2 |
| 2,6-lutidine | 0.7 |
| 2,5-lutidine | 2 |
| | 99.4 |

| Base Mixture E | % |
| --- | --- |
| beta-picoline | 13.2 |
| gamma-picoline | 84.6 |
| 2,4-lutidine | 0.7 |
| 2,5-lutidine | 1.5 |
| | 100.0 |

Base Mixture F
A commercial sample of pyridine bases marketed by Hopkin and Williams of England.

Base Mixture G
A commercial sample of pyridine bases marketed by Reilly Tar and Chemical Corporation as Mixed Picolines 145.

EXAMPLE 1

Quaternisation of N-2-chloroethyl-o-chloroaniline with Base Mixture A

A mixture of 14 parts of Base Mixture A (approximately a 3 mole per mole excess) and 9.6 parts of N-2-chloroethyl-o-chloroaniline were boiled at the reflux for 30 minutes. The resultant oil was allowed to cool to approximately 75° C. and transferred, whilst still mobile, to a beaker. The unreacted pyridine bases were removed by repeated washing and decantation with acetone (approximately 5×100 parts). The residual tar was dissolved in approximately 50 parts of cold water and the solution rendered acid to Congo Red paper by the addition of sulphuric acid. The solution was filtered to remove any insoluble material. The solution was used directly for conversion to dyestuff. This solution is subsequently referred to as 'I'.

Coupling of 4-Nitroaniline→I 6.9 Parts of para-nitro aniline were dissolved in 5 parts of water and 12 parts of concentrated hydrochloric acid by heating to 90°-100° C. The hot solution was drowned into a stirred mixture of 80 parts of ice-water at 0°-5° C. and 25 parts of 2 N sodium nitrite solution was added in one portion. The mixture was stirred for 20 minutes at 0°-5° C. in the presence of the nitrous acid after which time the excess nitrous acid was removed by the addition of sulphamic acid. The diazo solution was filtered to remove traces of insoluble matter.

The diazotised p-nitroaniline solution was added in one portion to solution I and the resulting red solution stirred for 18 hours at ambient temperature.

The red precipitate of protonated dyestuff mixture was filtered off and washed with a little cold water to remove the acidic liquors. The cake was slurried in 300 parts of acetone to remove traces of disperse dye, filtered, dissolved in 200 parts of hot water and screened from insolubles with the aid of carbon.

The filtrate was stirred and cooled to 25° C. and 10 parts of sodium chloride added to precipitate the dyestuff mixture. The precipitate was filtered off, washed with a little cold water and dried.

The dyestuff mixture was shown by Nuclear Magnetic Resonance and mass spectrography to be an approximate 1:1 mixture of the β- and γ-picolinium isomers with a trace of the α-picolinium isomer. It dyed polyacrylonitrile fibres bright reddish-yellow shades having excellent fastness properties.

The dyestuff mixture had superior solubility in water to the individual α-, β-, or γ-picolinium dyestuffs or the analogous pyridinium dyestuff. The increased aqueous solubility enables stable, concentrated liquid formulations to be obtained. The aqueous solubilities of the dyes at 25° C. and their behaviour in forming a liquid in a water/acetic acid/sulpholane solvent system are shown in Table 1.

Table 1
Solubility of dyestuffs based on the structure where Cy represents mixed picolines or the individual single cationic group.

$$O_2N-\underset{}{\bigcirc}-N{=}N-\underset{Cl}{\bigcirc}-NH\ CH_2CH_2\ Cy^+$$

| Cy | Solubility in water at 25° C. | Solubility of 1 part of dye in 1 part water 1.5 part acetic acid 1 part sulpholane |
|---|---|---|
| Approx. 1:1 mixture of β- and γ- picolines with a trace of α- picoline | Greater than 10% | Clear solution-stable at ambient temperature for at least 6 months. Stable at temp. −5° to 0° C. |
| Pyridine | Less than 0.25% | Not a solution at ambient temperature (large amount of undissolved dyestuff) |
| α-picoline | " | " |
| β-picoline | Between 0.25% and 0.5% | " |

Table 1-continued
Solubility of dyestuffs based on the structure where Cy represents mixed picolines or the individual single cationic group.

$$O_2N-\underset{}{\bigcirc}-N{=}N-\underset{Cl}{\bigcirc}-NH\ CH_2CH_2\ Cy^+$$

| Cy | Solubility in water at 25° C. | Solubility of 1 part of dye in 1 part water 1.5 part acetic acid 1 part sulpholane |
|---|---|---|
| γ-picoline | Between 7.5% and 10% | Not a solution at ambient temperature. (Better than pyridinium, α-, β-picolinium analogues). |

Table 2 lists further examples of dyestuff mixtures which are prepared by known method, for example by diazotisation and coupling as described in Example 1, the mixed cyclammonium residues being introduced by using a mixture of quaternising bases in place of a single quaternising agent in the preparation of either the diazo component on the coupling component according to whichever component carried the cyclammonium cationic group.

Column I gives the example number, Column II the dyestuff chromophore, Column III the base mixture employed in the quaternisation stage and Column IV the shade of the dyestuff on polyacrylonitrile. Although not indicated in the table the dyestuff mixtures have the chlorine anion. Dyestuffs with other anions can be prepared by analogous methods or the chlorine atom can be replaced by another anion by known methods if desired.

Table 2

| I | II | III | IV |
|---|---|---|---|
| 2 | $O_2N-\bigcirc-N{=}N-\underset{Cl}{\bigcirc}-NHC_2H_4Cy^\oplus$ | F | Reddish-yellow |
| 3 | " | B | " |
| 4 | " | C | " |
| 5 | " | G | " |
| 6 | " | D | " |
| 7 | " | E | " |
| 8 | $O_2N-\underset{Cl}{\bigcirc}-N{=}N-\underset{Cl}{\bigcirc}-NHC_2H_4Cy^\oplus$ | A | Orange |
| 9 | " | F | " |
| 10 | $O_2N-\underset{S}{\overset{N}{\diamond}}-N{=}N-\underset{Cl}{\bigcirc}-NHC_2H_4Cy^\oplus$ | A | Rubine |
| 11 | $NC-\bigcirc-N{=}N-\underset{Cl}{\bigcirc}-NHC_2H_4Cy^\oplus$ | A | Yellow |

Table 2-continued

| I | II | III | IV |
|---|---|---|---|
| 12 | (structure: 3-Cl-4-NC-C6H3–N=N–C6H3(Cl)–NHC2H4Cy⊕) | A | " |
| 13 | (structure: 2-Cl-4-O2N-C6H3–N=N–C6H4–N(C2H5)(C2H4Cy⊕)) | A | Red |
| 14 | " | F | " |
| 15 | " | E | " |
| 16 | " | B | " |
| 17 | " | C | " |
| 18 | " | D | " |
| 19 | (structure: 2,6-diCl-4-O2N-C6H2–N=N–C6H4–N(C2H5)(C2H4Cy⊕)) | A | Yellow-brown |
| 20 | (structure: ⊕CyC2H4HN2OS–C6H2(Cl)2–N=N–C6H4–N(CH3)(C2H4CN)) | A | Reddish-yellow |
| 21 | (structure: 2,5-diCl-C6H3–N=N–pyridone with Cy+ substituent) | A | Greenish-yellow |
| 22 | (structure: (CH3)2NO2S–C6H2(Cl)2–N=N–C6H3(CH3)–N(C2H5)(C2H4Cy+)) | A | Reddish-yellow |
| 23 | (structure: Cy⊕CH2CO–C6H4–N=N–C6H3(Cl)–NHC2H4CN) | A | " |
| 24 | (structure: Cy⊕CH2CO–C6H4–N=N–(2-methylindol-3-yl)) | A | Reddish-yellow |
| 25 | (structure: Cy⊕CH2CO–C6H4–N=N–C6H4–N(CH3)(CH2CH2CN)) | A | Orange |
| 26 | (structure: 2-CN-4-Cl-C6H3–N=N–C6H3(CH3)–N(C2H5)(C2H5Cy⊕)) | A | " |

Table 2-continued

| I | II | III | IV |
|---|---|---|---|
| 27 | 2,5-dichloro-4-(N,N-dimethylsulfamoyl)phenyl–N=N–C$_6$H$_4$–N(C$_2$H$_5$)(C$_2$H$_4$Cy$^\oplus$) | A | " |
| 28 | C$_6$H$_5$–N=N–C$_6$H$_4$–N=N–[pyridazinone with CH$_3$, Cy$^\oplus$, OH substituents] | A | Reddish-yellow |
| 29 | 2-nitrophenyl–N=N–[pyridinone with CH$_3$, CH$_2$Cy$^\oplus$, OH, C$_2$H$_5$, O substituents] | A | Greenish-yellow |
| 30 | 2-chloro-4-nitrophenyl–N=N–C$_6$H$_4$–N(C$_2$H$_5$)(C$_2$H$_4$Cy$^\oplus$) | C | Red |
| 31 | 2,6-dichloro-4-nitrophenyl–N=N–C$_6$H$_4$–N(C$_2$H$_5$)(C$_2$H$_4$Cy$^\oplus$) | C | Yellow-brown |
| 32 | Cy$^\oplus$C$_2$H$_4$NHO$_2$S–(2,6-dichlorophenyl)–N=N–C$_6$H$_4$–N(CH$_3$)(C$_2$H$_4$CN) | C | Reddish-yellow |
| 33 | (CH$_3$)$_2$N$_2$OS–(2,5-dichlorophenyl)–N=N–C$_6$H$_4$–N(C$_2$H$_5$)(C$_2$H$_4$Cy$^\oplus$) | C | Orange |
| 34 | (CH$_3$)$_2$N$_2$OS–(2,6-dichlorophenyl)–N=N–C$_6$H$_4$–N(C$_2$H$_5$)(C$_2$H$_4$Cy$^\oplus$) | C | Reddish-yellow |
| 35 | Cy$^\oplus$CH$_2$CO–C$_6$H$_4$–N=N–(2-chlorophenyl)–NHC$_2$H$_4$CN | C | " |
| 36 | Cy$^\oplus$CH$_2$CO–C$_6$H$_4$–N=N–(2-methylindol-3-yl) | C | " |

Table 2-continued

| I | II | III | IV |
|---|---|---|---|
| 37 | Ph-N=N-C6H4-N=N-C(CH3)=C(Cy⊕)-C(=O)-NH-C(OH)= (pyridone) | C | " |
| 38 | (2,5-diCl-C6H3)-N=N-C(CH3)=C(CH2Cy⊕)-C(=O)-NH-C(OH)= | C | Greenish-yellow |
| 39 | (2-NO2-C6H4)-N=N-C(CH3)=C(CH2Cy⊕)-C(=O)-N(C2H5)-C(OH)= | C | " |
| 40 | Cy⊕CH2CO-C6H4-N=N-C6H4-N(CH3)(C2H4CN) | C | Orange |
| 41 | (2-CN-4-Cl-C6H3)-N=N-C6H4-N(C2H5)(C2H4Cy⊕) | C | " |
| 42 | (2-Cl-4-NO2-C6H3)-N=N-C6H4-N(C2H5)(C2H4Cy⊕) | F | Red |
| 43 | (2,6-diCl-4-NO2-C6H2)-N=N-C6H4-N(C2H5)(C2H4Cy⊕) | F | Yellow-brown |
| 44 | Cy⊕C2H4NHO2S-(3,5-diCl-C6H2)-N=N-C6H4-N(CH3)(C2H4CN) | F | Reddish-yellow |
| 45 | (CH3)2NO2S-(2,5-diCl-C6H2)-N=N-C6H4-N(C2H5)(C2H4Cy⊕) | F | Orange |
| 46 | (CH3)2NO2S-(2,5-diCl-C6H2)-N=N-C6H4-N(C2H5)(C2H4Cy⊕) | F | Reddish-yellow |

Table 2-continued

| I | II | III | IV |
|---|---|---|---|
| 47 | 4-Cl-2-(Cy⊕CH₂CO-C₆H₃)-N=N-C₆H₃(Cl)-NHC₂H₄CN | F | " |
| 48 | Cy⊕CH₂CO-C₆H₄-N=N-(2-methylindol-3-yl) | F | " |
| 49 | C₆H₅-N=N-C₆H₄-N=N-[4-methyl-3-Cy⊕-6-hydroxy-2-oxo-1H-pyridine] | F | " |
| 50 | 2,5-diCl-C₆H₃-N=N-[4-methyl-3-Cy⊕-6-hydroxy-2-oxo-1H-pyridine] | F | Greenish-yellow |
| 51 | 2-NO₂-C₆H₄-N=N-[4-methyl-3-CH₂Cy⊕-6-hydroxy-1-ethyl-2-oxo-pyridine] | F | " |
| 52 | Cy⊕CH₂CO-C₆H₄-N=N-C₆H₄-N(CH₃)(C₂H₄CN) | F | Orange |
| 53 | 2-CN-4-Cl-C₆H₃-N=N-C₆H₄-N(C₂H₅)(C₂H₄Cy⊕) | F | " |
| 54 | 2-Cl-4-O₂N-C₆H₃-N=N-C₆H₄-N(C₂H₅)(C₂H₄Cy⊕) | D | Red |
| 55 | 2,6-diCl-4-O₂N-C₆H₂-N=N-C₆H₄-N(C₂H₅)(C₂H₄Cy⊕) | D | Yellow-brown |
| 56 | Cy⊕C₂H₄NHO₂S-C₆H₂(3,5-diCl)-N=N-C₆H₄-N(CH₃)(C₂H₄CN) | D | Reddish-yellow |

Table 2-continued

| I | II | III | IV |
|---|---|---|---|
| 57 | [structure: 2,5-dichloro-4-(N,N-dimethylsulfamoyl)phenyl–N=N–C6H4–N(C2H5)(C2H4Cy⊕)] | D | Orange |
| 58 | [structure: 2,6-dichloro-4-(N,N-dimethylhydroxylamino)phenyl–N=N–C6H4–N(C2H5)(C2H4Cy⊕)] | D | Reddish-yellow |
| 59 | Cy⊕CH2CO–C6H4–N=N–(3-chloro-4-NHC2H4CN)C6H3 | D | " |
| 60 | Cy⊕CH2CO–C6H4–N=N–(2-methyl-1H-indol-3-yl) | D | " |
| 61 | C6H5–N=N–C6H4–N=N–[4-methyl-3-Cy⊕-6-hydroxy-2-oxo-1H-pyridinyl] | D | " |
| 62 | 2,5-dichlorophenyl–N=N–[4-methyl-3-Cy⊕-6-hydroxy-2-oxo-1H-pyridinyl] | D | Greenish-yellow |
| 63 | 2-nitrophenyl–N=N–[4-methyl-3-CH2Cy⊕-6-hydroxy-2-oxo-1-ethyl-pyridinyl] | D | " |
| 64 | Cy⊕CH2CO–C6H4–N=N–C6H4–N(CH3)(C2H4CN) | D | Orange |
| 65 | [2-CN-4-Cl-phenyl]–N=N–C6H4–N(C2H5)(C2H4Cy⊕) | D | " |
| 66 | [2-Cl-4-NO2-phenyl]–N=N–C6H4–N(C2H5)(C2H4Cy⊕) | F | Red |

Table 2-continued

| I | II | III | IV |
|---|---|---|---|
| 67 | 2,6-dichloro-4-nitrophenyl–N=N–C6H4–N(C2H5)(C2H4Cy⊕) | E | Yellow-brown |
| 68 | Cy⊕C2H4NHO2S–(3,5-dichlorophenyl)–N=N–C6H4–N(CH3)(C2H4CN) | E | Reddish-yellow |
| 69 | (CH3)2N·O2S–(2,5-dichlorophenyl)–N=N–C6H4–N(C2H5)(C2H4Cy⊕) | E | Orange |
| 70 | (CH3)2N·O2S–(2,6-dichlorophenyl)–N=N–C6H4–N(C2H5)(C2H4Cy⊕) | E | Reddish-yellow |
| 71 | Cy⊕CH2CO–C6H4–N=N–(3-chlorophenyl)–NHC2H4CN | E | " |
| 72 | Cy⊕CH2CO–C6H4–N=N–(2-methylindol-3-yl) | E | " |
| 73 | C6H5–N=N–C6H4–N=N–(4-methyl-3-Cy⊕-6-hydroxy-2-oxo-1H-pyridin-5-yl) | E | " |
| 74 | (2,5-dichlorophenyl)–N=N–(4-methyl-3-Cy⊕-6-hydroxy-2-oxo-1H-pyridin-5-yl) | E | Greenish-yellow |
| 75 | (2-nitrophenyl)–N=N–(4-methyl-3-CH2Cy⊕-6-hydroxy-1-ethyl-2-oxopyridin-5-yl) | E | " |
| 76 | Cy⊕CH2CO–C6H4–N=N–C6H4–N(CH3)(C2H4CN) | E | Orange |

Table 2-continued

| I | II | III | IV |
|---|---|---|---|
| 77 | 2-cyano-4-chlorophenyl-N=N-C₆H₄-N(C₂H₅)(C₂H₄Cy⊕) | E | " |
| 78 | 1-NHCH₃, 4-NH(CH₂)₃Cy⊕ anthraquinone | A | Reddish-blue |
| 79 | " | B | " |
| 80 | " | C | " |
| 81 | " | D | " |
| 82 | " | E | " |
| 83 | " | F | " |
| 84 | " | G | " |
| 85 | 2-Cl-4-NO₂-phenyl-N=N-C₆H₄-N(C₂H₅)(C₂H₄Cy⊕) | B | Red |
| 86 | 2,6-Cl₂-4-NO₂-phenyl-N=N-C₆H₄-N(C₂H₅)(C₂H₄Cy⊕) | B | Yellow-brown |
| 87 | Cy⊕C₂H₄NHO₂S-(3,5-Cl₂)C₆H₂-N=N-C₆H₄-N(CH₃)(C₂H₄CN) | B | Reddish-yellow |
| 88 | (CH₃)₂N-SO₂-(2,5-Cl₂)C₆H₂-N=N-C₆H₄-N(C₂H₅)(C₂H₄Cy⊕) | B | Orange |
| 89 | (CH₃)₂N-SO₂-(2,6-Cl₂)C₆H₂-N=N-C₆H₄-N(C₂H₅)(C₂H₄Cy⊕) | B | Reddish-yellow |
| 90 | Cy⊕CH₂O-C₆H₄-N=N-(3-Cl)C₆H₃-NHC₂H₄CN | B | " |
| 91 | Cy⊕CH₂O-C₆H₄-N=N-(2-methylindol-3-yl) | B | " |

Table 2-continued

| I | II | III | IV |
|---|---|---|---|
| 92 | (phenyl-N=N-phenyl-N=N- pyridinone with CH₃, Cy⊕, HO, NH, O substituents) | B | " |
| 93 | (2,5-dichlorophenyl-N=N- pyridinone with CH₃, Cy⊕, HO, NH, O) | B | Greenish-yellow |
| 94 | (2-nitrophenyl-N=N- pyridinone with CH₃, CH₂Cy⊕, HO, N-C₂H₅, O) | B | " |
| 95 | Cy⊕CH₂CO—(phenyl)—N=N—(phenyl)—N(CH₃)(C₂H₄CN) | B | Orange |
| 96 | (2-CN-4-Cl-phenyl)—N=N—(phenyl)—N(C₂H₅)(C₂H₄Cy⊕) | B | " |
| 97 | (anthraquinone with 1-NH(CH₂)₃Cy⊕ and 4-NH-(2,4-dimethylphenyl)) | A | Reddish-blue |
| 98 | " | B | " |
| 99 | " | C | " |
| 100 | " | D | " |
| 101 | " | E | " |
| 102 | " | F | " |
| 103 | " | G | " |
| 104 | (2-Cl-4-NO₂-phenyl)—N=N—(phenyl)—N(C₂H₅)(C₂H₄Cy⊕) (O₂N at position shown) | A | Red |
| 105 | " | G | " |
| 106 | (phenyl-N=N-phenyl-N=N- pyridinone with CH₃, CN, HO, N-CH₂CH₂Cy⊕, O) | A | Yellow |
| 107 | Cy⊕CH₂CO—(phenyl)—N=N—(pyrazole with CH₃, HO, N-Ph) | A | " |

Table 2-continued

| I | II | III | IV |
|---|---|---|---|
| 108 | Cy⊕CH₂CO—⟨C₆H₄⟩—N=N—C(·)=C(OH)—N(C₂H₅)—C(=O)—⟨C₆H₄⟩ (phthalimide-type structure) | A | " |
| 109 | Cy⊕CH₂CO—⟨C₆H₄⟩—N=N—CH(COCH₃)(CONH—C₆H₅) | A | " |
| 110 | Cy⊕CH₂CO—⟨C₆H₄⟩—N=N—(quinoline)—NHC₂H₄CN | A | Red |
| 111 | Cy⊕CH₂CO—⟨C₆H₄⟩—N=N—(2-hydroxynaphthalen-1-yl) | A | Orange |
| 112 | Cy⊕CH₂CO—⟨C₆H₄⟩—N=N—⟨2-OH-5-CH₃-C₆H₃⟩ | A | Yellow |
| 113 | Cy⊕CH₂CO—⟨C₆H₄⟩—N=N—(tetrahydroquinoline with N—C₂H₄CN) | A | Scarlet |
| 114 | Cy⊕CH₂CO—⟨C₆H₄⟩—N=N—C(OH)=C(CH₃)—C(CN)=C(—N(C₂H₅)—)=O (pyridone) | A | Yellow |
| 115 | CH₃O—⟨C₆H₄⟩—N=N—(3-methyl-5-hydroxy-1-phenylpyrazole) with SO₂NHC₂H₄Cy⊕ on phenyl | A | " |

Table 2-continued

| I | II | III | IV |
|---|---|---|---|
| 116 | [structure: 2-nitrophenyl-N=N-C(benzamide ring with HO and N-C₂H₄Cy⊕)] | A | " |
| 117 | $O_2N$-C₆H₄-N=N-[quinoline with NHC₂H₄Cy⊕] | A | Rubine |
| 118 | $O_2N$-C₆H₄-N=N-[tetrahydroquinoline with N-C₂H₄Cy⊕] | A | Red |

Tables 3 and 4 given below show the solubility of the dyestuff mixtures of Example 13 and of Example 19 (with an acid sulphate anion) respectively compared with the solubility of similar individual dyestuffs having a single cyclammonium cationic group present. The improvement in solubility conferred by the use of mixed cyclammonium groups is clearly demonstrated by the figures given in the tables.

Table 3

Dyestuff of Example 13

[Structure: $O_2N$-(2-Cl-C₆H₃)-N=N-C₆H₄-N(C₂H₅)(C₂H₄Cy⊕) Cl⊖]

| Cy | Solubility in water at 25° C. | 50° C. |
|---|---|---|
| As Example 13. Approx. 1:1 mixture of β- and γ-picoline with a trace of α-picoline | 4% | 52% |
| Pyridine | 1% | 30% |
| γ-picoline | 1% | 24% |

Table 4

Dyestuff of Example 19 (acid sulphate cation)

[Structure: $O_2N$-(2,6-diCl-C₆H₂)-N=N-C₆H₄-N(C₂H₅)(C₂H₄Cy⊕) HSO₄⊖]

| Cy | Solubility in water at 25° C. | 50° C. |
|---|---|---|
| As Example 19 Approx. 1:1 mixture of β- and γ-picolines with a trace of α-picoline. | 4% | 45% |
| Pyridine | 1% | 2% |
| γ-picoline | 0.1% | 0.5% |

I claim:

1. A mixture of water soluble cationic azo dyestuffs devoid of carboxylic acid or sulphonic acid groups, each dyestuff in said mixture containing at least one cyclammonium group and said dyestuffs differing only in the constitution of the said cyclammonium group, said cyclammonium group being a gamma-picolinium group in one dyestuff and a beta-picolinium group in another dyestuff in said mixture, the water-solubility of said mixture being superior to that of the individual dyestuffs.

* * * * *